(12) United States Patent
Sturm

(10) Patent No.: US 6,342,022 B1
(45) Date of Patent: Jan. 29, 2002

(54) MODULAR PRESSURE RELIEF VALVE FOR DIFFERENTIAL ASSEMBLY

(76) Inventor: Gary Sturm, 15231 Amstutz Rd., Leo, IN (US) 46765-9598

(*) Notice: Subject to any disclaimer, the term of this patent is extended or adjusted under 35 U.S.C. 154(b) by 0 days.

(21) Appl. No.: 09/482,601

(22) Filed: Jan. 14, 2000

(51) Int. Cl.[7] ................................................ F16H 48/30
(52) U.S. Cl. ...................................................... 475/88
(58) Field of Search ........................................... 475/88

(56) References Cited

U.S. PATENT DOCUMENTS

| | | | |
|---|---|---|---|
| 3,040,600 A | 6/1962 | Mueller | |
| 3,361,008 A | * | 1/1968 | Fallon ........................ 475/88 |
| 3,656,870 A | 4/1972 | Kusakabe et al. | |
| 3,724,289 A | 4/1973 | Kennicutt | |
| 3,831,461 A | 8/1974 | Mueller | |
| 3,894,446 A | 7/1975 | Snoy et al. | |
| 4,099,893 A | 7/1978 | Coffman | |
| 4,727,966 A | * | 3/1988 | Hiramatsu et al. ............ 475/88 |
| 5,211,542 A | 5/1993 | Fraser et al. | |
| 5,299,986 A | 4/1994 | Fabris et al. | |
| 5,310,323 A | 5/1994 | Hansen | |
| 5,362,210 A | 11/1994 | Richardson, Jr. | |
| 5,378,118 A | 1/1995 | Phillips | |

* cited by examiner

*Primary Examiner*—Dirk Wright
(74) *Attorney, Agent, or Firm*—Liniak, Berenato, Longacre & White

(57) ABSTRACT

A modular pressure relief valve assembly for a hydraulically actuated clutch pack or limited slip device in a limited slip differential or torque coupling device. The modular assembly is removably disposed in the differential case and is connected to a passageway leading to a limited slip device within the differential case to establish fluid communication there between.

20 Claims, 1 Drawing Sheet

MODULAR PRESSURE RELIEF VALVE FOR DIFFERENTIAL ASSEMBLY

BACKGROUND OF THE INVENTION a) Field of the Invention

This invention relates to a modular pressure relief valve arrangement in a limited slip differential or torque coupling device for use with a vehicle drive train, for example, a speed sensitive limited slip differential; and more particularly is directed a removable modular valve assembly for a hydraulically actuated clutch pack in such a limited slip device.

b) Background of Related Art

Limited slip differentials, or torque coupling devices are well known in the art. In such limited slip devices, a hydraulically actuated friction clutch pack is actuated to retard relative rotation of at least one of the side gears relative to the differential case. Normally, hydraulic pressure is directly increased in response to an increase in rotational speed differential of the axle gears. One common way to provide the hydraulic pressure is to include an internal pump, or gerotor pump, within the differential case. As hydraulic pressure increases as a result of the increased speed of the pump (increased speed differential between one output shaft and the different case) there is a need to provide a pressure relief valve to provide relief from pressure build up in the limited slip device. In other words, once the hydraulic pressure reaches a predetermined level, the pressure relief valve relieves that pressure.

One such pressure relief valve of the related art is shown in FIG. 4. A ball is simply provided in a ball seat on the external surface of the differential case. The ball seat is in communication with hydraulic fluid of the limiting device. The ball is retained in the seat by a leaf spring secured to the outer surface of the differential case. As hydraulic pressure in the limiting device increased, the ball is forced against the leaf spring. If sufficient pressure exists, the leaf spring opens and fluid is allowed to flow out of the differential case. Otherwise, the valve remains closed. However, while this type of leaf spring ball valve does relieve excessive pressures, it suffers from the drawback that too many variables effect the opening and closing of the valve. During operation of the differential assembly, the related art valve does not predictably open and close consistently as desired.

The need therefore exists for an improved differential relief valve that is simple in design, easy to assembly and opens and closes in a predictable and consistent manner.

SUMMARY OF THE INVENTION

The present invention provides an improved pressure relief valve for use in a limited slip differential or torque coupling device. A modular pressure relief valve assembly is removably disposed in the differential case and is connected to a passageway leading to a limited slip device within the differential case to establish fluid communication there between.

When pressure within the differential case or limited slip device exceeds a predetermined pressure, the ball is lifted from the valve seat and fluid passes through the differential case to an exterior within the differential housing. When pressure in the differential case and limited slip device is less than the pre-determined pressure, fluid is prevented from passing through the valve.

The objects, features and advantages of the present invention are readily apparent from the following detailed description of the best modes for carrying out the invention when taken in connection with the accompanying drawings.

DETAILED DESCRIPTION OF PREFERRED EMBODIMENTS

Figure 1:
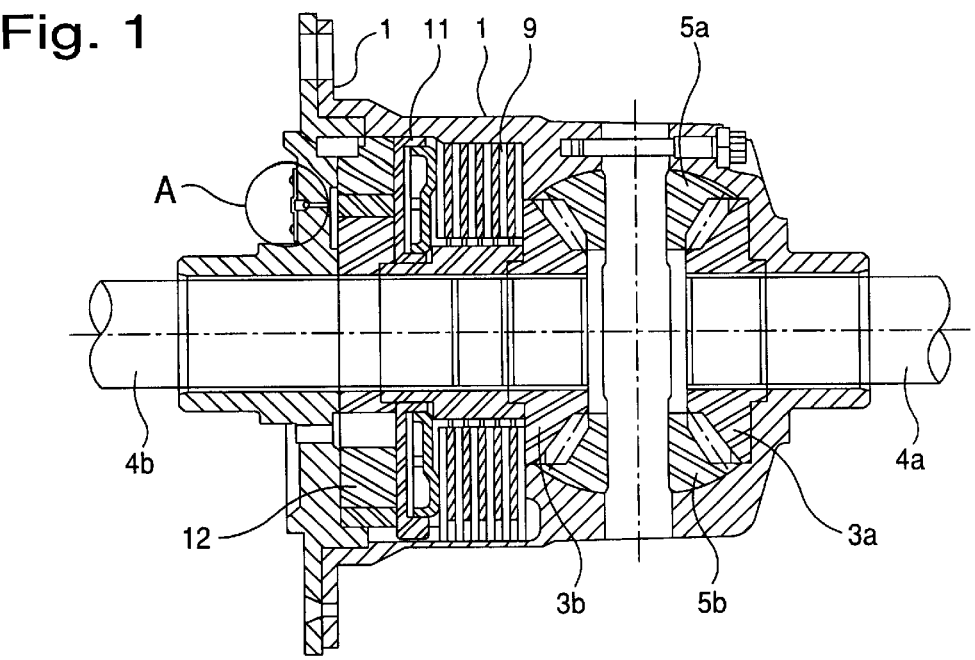
FIG. 1 is a sectional view of a limited slip differential employing the self-contained cartridge pressure relief valve assembly of the present invention.
Figure 4:
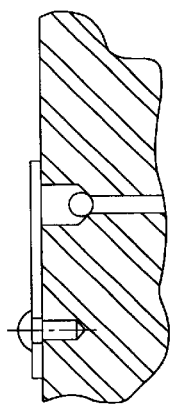
FIG. 4 is a sectional view of a related art pressure relief valve.
Figure 2:
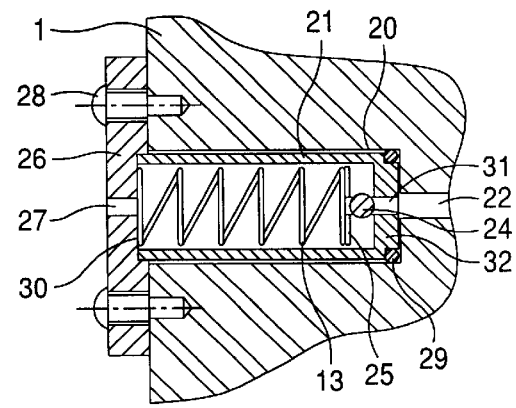
FIG. 2 is an enlarged sectional view of the self-contained cartridge pressure relief valve assembly shown in FIG. 1.
Figure 3A:
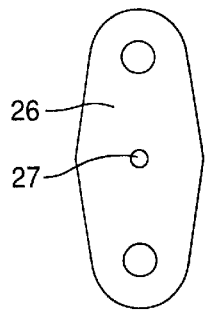
FIG. 3a & 3B is a front and sectional view, respectively, of the self-contained cartridge pressure relief valve assembly.
Figure 3B:
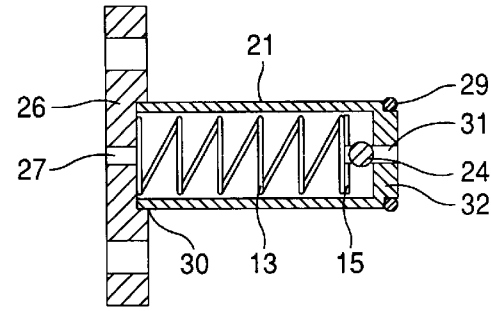

FIG. 1 is a cross sectional view of a limited slip differential employing the pressure relief valve of the present invention. However, it is to be understood that while the present invention is described in relation to a speed sensitive limited slip differential, the present invention is equally suitable for use in torque coupling mechanisms, other hydraulic couplings for a drive-train utilizing a speed sensitive limited slip device. A differential case 1 driven by a ring gear (not shown) houses a pair of side gears 3a, 3b a pair of pinion gears 5a, 5b and a pinion shaft 7 to allow speed differential between a pair of opposite output shafts 4a, 4b as is commonly known in the art. A limited slip device in the form of a clutch pack 9 is disposed between the side gear 3b and the differential case 1. A plurality of friction discs are alternately splined onto the side gear 3b and differential case 1. A hydraulically actuated piston 11 disposed within a piston chamber serves to compress the clutch pack 9 and retard any speed differential between the side gear 3b and differential case 1. This results in a retardation of any speed differential between the shafts 4a, 4b. Preferably a gerotor pump 12 is employed to provide pressurized hydraulic fluid to actuate the piston 11 and engage the clutch pack. In such an arrangement, as the relative speed between the output shafts 4a, 4b increases, the gerotor pump 12 pumps fluid to the piston chamber to actuate the clutch pack. As the speed increases, the pressure increases. In order to relieve pressure build up in the piston chamber, a self-contained pressure relief valve assembly is disposed within the differential case 11. FIGS. 2 & 3 depict the self-contained cartridge pressure relief valve assembly according to the present invention.

FIG. 2 is an enlarged view of area A of FIG. 1. The modular pressure relief valve of the present invention includes a hollow container 20 having a first substantially closed end with an inlet opening 31 to allow fluid to enter the hollow container 21. A valve seat 32 is formed on an interior side of the inlet opening 31 to engage a ball 24. A second opposite end of the hollow container is open and is secured to a retainer 26. The retainer 26 has an outlet opening 27 formed adjacent the second open end of the hollow container to allow fluid to emerge from the modular assembly. The retainer 26 is ultrasonically interference welded to the hollow container 21 to form a sealed connection there between. Preferably, the retainer 26 and the hollow container 21 are made of any suitable plastic. However, other materials, such as metals may also be employed. Disposed within the hollow container 21 is a coiled spring 23 a valve plate 25 and the ball 24. The coiled spring 23 is disposed between the retainer 26 and the ball 24 to bias the ball 24 to engage the valve seat 32. The valve plate 25 is simply disposed between the coiled spring 23 and the ball 24 to facilitate proper positioning and alignment of the ball 24 within the valve seat 32.

The modular pressure relief valve assembly is disposed within a bore 20 formed in the differential case 1 leading to a passageway 22 which in turn leads to an interior of the differential case and the limited slip device. When hydraulic pressure within the passageway 22 exceeds a predetermined valve, the ball 24 is lifted off the valve seat 32 and hydraulic fluid is allowed to flow from the passageway 22, through the modular pressure relief valve assembly and to an exterior of the differential case 1. When the pressure in the passage way is below the predetermined value, the ball 24 remains biased against the valve seat 32 to prevent fluid flow between the passageway 22 and the modular valve assembly thereby preventing pressure relief to the exterior of the differential case 2. An O-ring seal 29 is disposed within a notch formed on the exterior of the hollow container 21 and is disposed between the differential case 1 and the hollow container 21 to form a hydraulic seal there between. Preferably, the o-ring is positioned adjacent the inlet opening 31 and the passageway 22.

The modular pressure relief assembly is secured to the differential case 1 by simply screwing the retainer 26 to an external surface of the differential case 1 via screws 28. The assembly of the valve assembly to the differential 1 case is extremely simple. Because the modular pressure relief assembly is a self-contained unit, it is simply inserted into the bore 20 and screwed in place. The modular assembly alleviates costly and timely valve assembly. Moreover, changing the predetermined pressure at which the valve assembly allows fluid flow is simply a matter of changing a modular assembly with a coiled spring having a differential spring constant. Thus it can be seen that the modular valve assembly of the present invention provides a simple and reliable pressure relief valve for a limited slip device in a differential or torque coupling arrangement.

While the present invention has been shown and described with reference to specific embodiments forming the best mode, various changes in form and detail may be made without departing from the spirit and scope of the invention. While the best modes for carrying out the invention have been described in detail, those familiar with the art to which this invention relates will recognize various alternatives, designs and embodiments for practicing the present invention as defined by the following claims. For example, the present invention may be used in a direct torque coupling arrangement where speed sensitive coupling between the shafts 4a, and 4b are desired. In such an arrangement, the output shaft 4a is in driving connection with the differential case 11 and the pinion and side gears are removed from within the differential case. When differential rotational speed between the input shaft 4b and differential case 11 exists, the gerotor pump 12 compacts the clutch pack 9 to retard relative rotation between the input shaft 4b and the differential case 11 and consequently between the input shaft 4b and output shaft 4a. In this arrangement alternating friction disc of the clutch pack 9 may be splined directly to the input shaft 4b. The gerotor pump 12 works much the same way as in the differential embodiment. As the input shaft 4b rotates faster than the differential case 11, hydraulic pressure increases and forces the piston 11 against the clutch pack 9 to retard the relative rotation between the differential case 11 and the input shaft 4b. The pressure relief valve arrangement relieves pressure in the limited slip device in precisely the same way as in the differential embodiment disclosed above.

What is claimed is:

1. A pressure relief valve assembly in a differential axle assembly comprising:

a differential case containing a differential gear assembly driven by an input shaft and adapted to allow differential rotational speed between a pair of opposing output shafts;

a hydraulically actuated limited slip device disposed within said differential case for retarding said differential rotational speed between said output shafts;

a self contained modular pressure relief valve assembly secured to said differential case and in communication with a passageway leading to said hydraulically actuated limited slip device to relieve pressure in said limited slip device, wherein when fluid pressure in limited slip device reaches a predetermined value said valve assembly permits fluid to pass there through to an exterior of said differential case and when said fluid pressure in said limited slip device is below said predetermined value said valve assembly prevents fluid flow between said limited slip device and said exterior of said differential case.

2. The device according to claim 1, wherein said modular pressure relief valve assembly is removably secured to said differential case.

3. The device according to claim 1, wherein said modular pressure relief valve assembly comprises:

a hollow container having a first end and a second open end, said first end having an inlet opening to allow fluid flow from said passageway to within said hollow container, said hollow container having a valve seat formed on an interior side of said inlet opening, a retainer secured to said hollow container and substantially covering said open end thereof, said retainer having an outlet opening to allow fluid flow from an interior of said hollow container to said exterior of said differential case;

a ball disposed within said hollow container a spring disposed within said hollow container to bias said ball against said valve seat, wherein when fluid pressure in said passageway exceeds said predetermined value said ball is lifted from said valve seat to allow said fluid to flow through said modular pressure relief valve assembly to said exterior and when said fluid pressure in said passageway is below said predetermined value said spring maintains said ball against said valve seat to prevent said fluid flow between said passageway and said exterior of said differential case.

4. The assembly according to claim 3, wherein said spring is a coiled spring.

5. The assembly according to claim 3, wherein said retainer is ultrasonically interference welded to said hollow container.

6. The assembly according to claim 3, Wherein said hollow container is disposed within a bore formed within said differential case and said retainer is screwed to an external surface of said differential case.

7. The assembly according to claim 6, Wherein said assembly further comprises a seal disposed between said hollow container and said bore to form a hydraulic seal there between.

8. The assembly according to claim 7, wherein said seal is an o-ring disposed within an annular notch formed on an external surface of said hollow container.

9. A pressure relief valve in a differential axle assembly comprising:

a differential case containing a differential gear assembly driven by an input shaft and adapted to allow differential rotational speed between a pair of opposing output shafts;

a modular pressure relief valve assembly secured to said differential case and in communication with a passageway leading to an interior of said differential case, wherein, when fluid pressure in said passageway exceeds a predetermined value said modular pressure relief valve assembly allows fluid to pass through said modular pressure relief valve assembly to an exterior of said differential case and when said fluid pressure in said passageway is below said predetermined value said modular pressure relief valve assembly prevents fluid flow between said passageway and said exterior.

10. The device according to claim 9, wherein said modular pressure relief valve assembly is removably secured to said differential case.

11. The device according to claim 9, wherein said modular pressure relief valve assembly comprises:

a hollow container having a first end and a second open end, said first end having an inlet opening to allow fluid flow from said passageway to within said hollow container, said hollow container having a valve seat formed on an interior side of said inlet opening, a retainer secured to said hollow container and substantially covering said open end thereof, said retainer having an outlet opening to allow fluid flow from an interior of said hollow container to said exterior of said differential case;

a ball disposed within said hollow container a spring disposed within said hollow container to bias said ball against said valve seat, wherein when fluid pressure in said passageway exceeds said predetermined value said ball is lifted from said valve seat to allow said fluid to flow through said modular pressure relief valve assembly to said exterior and when said fluid pressure in said passageway is below said predetermined value said spring maintains said ball against said valve seat to prevent said fluid flow between said passageway and said exterior of said differential case.

12. The assembly according to claim 11, wherein said spring is a coiled spring.

13. The assembly according to claim 11, wherein said retainer is ultrasonically interference welded to said hollow container.

14. The assembly according to claim 11, Wherein said hollow container is disposed within a bore formed within said differential case and said retainer is screwed to an external surface of said differential case.

15. The assembly according to claim 14, Wherein said assembly further comprises a seal disposed between said hollow container and said bore to form a hydraulic seal there between.

16. The assembly according to claim 15, wherein said seal is an o-ring disposed within an annular notch formed on an external surface of said hollow container.

17. A pressure relief valve in a torque coupling device between an input shaft and an output second shaft, said device comprising:

a differential case in driving connection with said output shaft;

a hydraulically actuated limited slip device disposed between said differential case and said input shaft and retarding differential rotational speed between said input shaft and output shaft;

a self contained modular pressure relief valve assembly secured to said differential case and in communication with said hydraulically actuated limited slip device to relieve pressure in said limited slip device.

18. The assembly according to claim 17, wherein said modular pressure relief valve assembly is removably secured to said differential case and comprises:

a hollow container having a first end and a second open end, first end having an inlet opening to allow fluid flow from said passageway to within said hollow container, said hollow container having a valve seat formed on an interior side of said inlet opening, a retainer secured to said hollow container and substantially covering said open end thereof, said retainer having an outlet opening to allow fluid flow from an interior of said hollow container to said exterior of said differential;

a ball disposed within said hollow container a spring disposed within said hollow container to bias said ball against said valve seat, wherein when fluid pressure in said passageway exceeds said predetermined value said ball is lifted from said valve seat to allow said fluid to flow through said modular pressure relief valve assembly to said exterior and when said fluid pressure in said passageway is below said predetermined value said spring maintains said ball against said valve seat to prevent said fluid flow between said passageway and said exterior of said differential case.

19. The assembly according to claim 18, wherein said retainer is ultrasonically interference welded to said hollow container.

20. The assembly according to claim 3, Wherein said hollow container is disposed within a bore formed within said differential case and said retainer is screwed to an external surface of said differential case, said assembly further comprising a seal disposed between said hollow container and said bore to form a hydraulic seal there between, and said seal is an o-ring disposed within an annular notch formed on an external surface of said hollow container.

* * * * *